United States Patent

[11] 3,600,661

| [72] | Inventors | Leonard A. Briggs<br>Rayleigh;<br>Harold Morton, Audenshaw; Jan<br>Swiderski, Preston, all of, England |
|---|---|---|
| [21] | Appl. No. | 875,163 |
| [22] | Filed | Nov. 10, 1969 |
| [45] | Patented | Aug. 17, 1971 |
| [73] | Assignees | Butec Limited<br>Preston, Lancashire, England;<br>Oldham & Son Limited<br>Denton, Manchester, England |
| [32] | Priority | Nov. 11, 1968 |
| [33] | | Great Britain |
| [31] | | 53443/68 |

[54] TEMPERATURE COMPENSATED AND PROTECTED BATTERY CHARGING APPARATUS
9 Claims, 1 Drawing Fig.

[52] U.S. Cl. ................................................. 320/35,
317/31, 317/41, 320/48, 320/64, 322/33, 322/81
[51] Int. Cl. ................................................. H02j 7/14
[50] Field of Search ....................................... 320/35, 36,
48, 61, 64 DIG. 1; 322/33, 34, 81, 99; 317/40, 41

[56] References Cited
UNITED STATES PATENTS

| 3,106,665 | 10/1963 | Byles .......................... | 320/35 X |
| 3,121,837 | 2/1964 | Holm et al. ................... | 320/35 X |
| 3,201,681 | 8/1965 | Van Wilgen et al. .......... | 320/61 X |
| 3,209,236 | 9/1965 | Bridgeman .................... | 322/81 X |
| 3,241,030 | 3/1966 | Oster............................ | 320/35 |
| 3,296,516 | 1/1967 | Paine et al. ................... | 320/35 |
| 3,479,575 | 11/1909 | Wright et al................... | 320/64 |
| 3,491,285 | 1/1970 | Nowakowski................. | 322/28 |
| 3,500,074 | 3/1970 | Obenhaus...................... | 317/13 |
| FOREIGN PATENTS | | | |
| 1,159,388 | 7/1969 | Great Britain................ | 320/35 |

Primary Examiner—J. D. Miller
Assistant Examiner—John M. Gunther
Attorney—Scrivener, Parker, Scrivener & Clarke ABSTRACT: A temperature compensation arrangement in or for battery charging equipment embodying a voltage regulator, the voltage regulator having a feedback arrangement in which a potential divider is provided for feeding back a fraction of the regulated voltage for regulating the charging current applied to a battery. The temperature compensation arrangement is provided with two shunt paths for shunting the respective parts of the potential divider, the impedance of the shunt paths being made variable in dependence upon the temperature of a part of the equipment so that the fraction of the regulated voltage fed back varies with temperature.

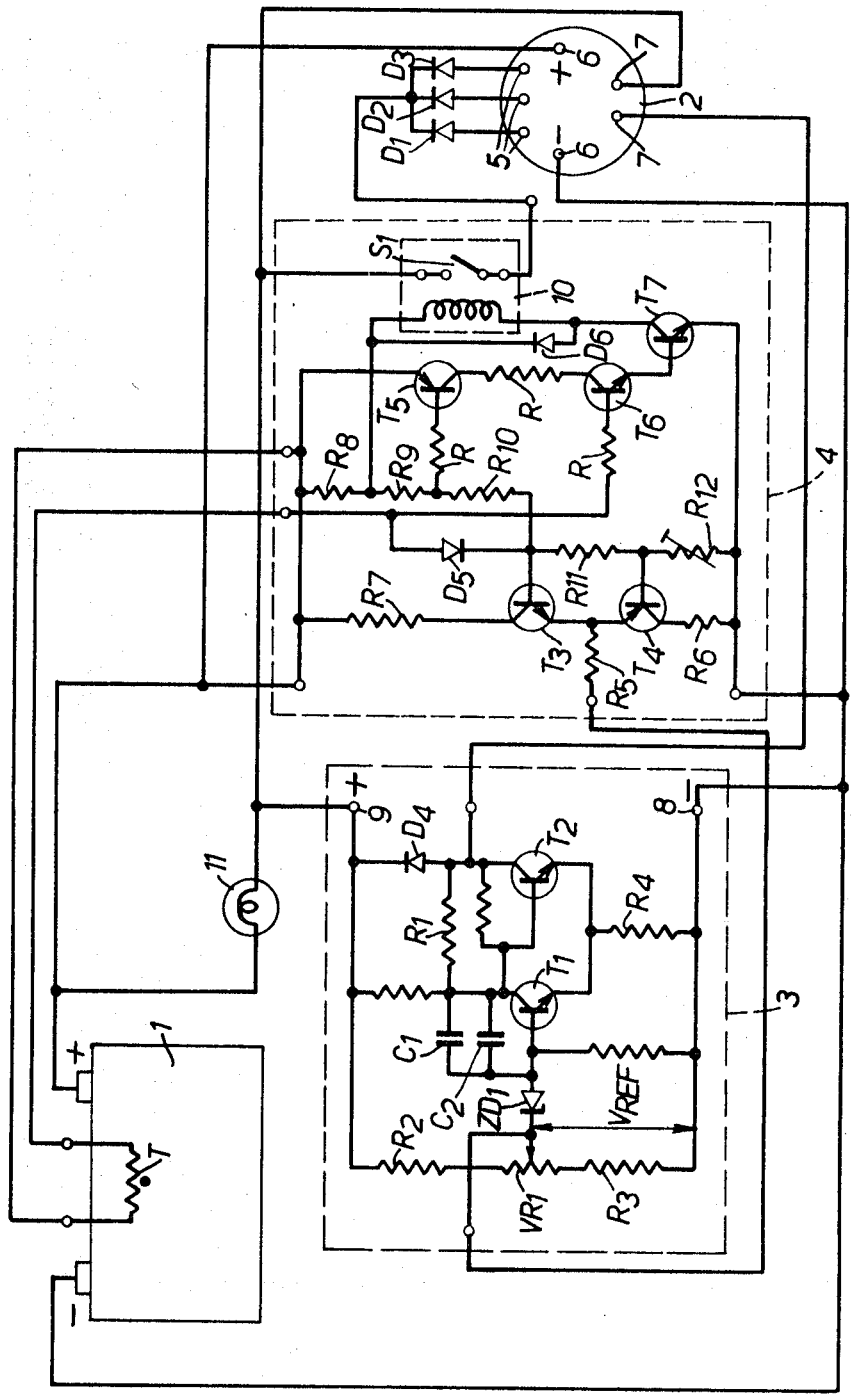

TEMPERATURE COMPENSATED AND PROTECTED BATTERY CHARGING APPARATUS

This invention relates to battery charging arrangements.

According to the present invention there is provided a temperature compensation arrangement for use in battery charging equipment embodying voltage regulator means having a feedback arrangement in which potential divider means is provided for feeding back a fraction of the regulated voltage for regulating the charging current applied to a battery, said temperature compensation arrangement comprising means appertaining to the respective parts of the potential divider means and adapted to operate thereon for changing the fraction of the regulated voltage fed back in dependence upon the temperature of a part or parts of said equipment.

In carrying out the invention the means appertaining to the respective parts of the potential divider means comprises shunting means arranged to shunt the respective parts of the potential divider means.

In one arrangement the temperature compensation means may comprise complementary transistor means affording two shunt paths, each of which appertains to a respective part of the potential divider means, the complementary transistor means being operable in dependence upon temperature sensor means forming part of the battery charging equipment.

In a preferred arrangement the temperature sensor means will be located in or near the battery and effective for sensing its temperature so that regulation of the charging current of the battery is obtained in dependence upon the battery temperature.

In carrying out the invention according to the aforesaid preferred arrangement, the temperature sensor means may comprise a temperature sensitive resistor in which case the temperature sensitive resistor may have a negative temperature coefficient, such as for example, a thermistor. Conveniently the temperature sensitive resistor may be connected to form part of further potential divider means which is effective for causing said complementary transistor means to be operable.

In order to prevent the battery temperature from exceeding a predetermined level the temperature compensation means may also be provided with means associated with the further potential divider means for substantially reducing the charging current applied to the battery when the resistance of the temperature sensitive resistor corresponds to said predetermined temperature.

In one arrangement the means associated with the further potential divider means for substantially reducing the battery charging current may comprise further transistor means having electromagnetic relay means associated therewith, switch contacts of the relay means being effective for causing the charging current applied to the battery to be substantially reduced.

In order to afford protection to the battery in the event of temperature sensitive resistor breakdown e.g. becoming open circuit, there may also be provided additional transistor means associated with the further transistor means and operable when the temperature sensitive resistor fails for causing the further transistor means to be operated to substantially reduce the charging current applied to the battery.

There may also be provided for indication purposes warning light means for affording an indication when the charging current applied to the battery has been substantially reduced and conveniently the indication that the charging current has been substantially reduced may be afforded by the charge warning light forming part of said equipment.

The foregoing and other features of the invention will now be described with reference to the accompanying drawing which is a circuit diagram of a battery charging arrangement incorporating a temperature compensation arrangement according to the present invention.

The circuit arrangement shown in the drawing consists of a battery 1 which is charged by means of an externally driven alternator 2, the output voltage of the alternator being controlled by a regulator 3 in conjunction with a temperature compensation and protection circuit 4.

The alternator 2 shown schematically in the drawing is of conventional form and consists of a 3-phase delta connected stator winding (not shown) the respective outputs of which are connected to output terminals 5 and also to full-wave rectifiers (not shown) located within the alternator, the common outputs from the rectifiers providing a DC voltage via output terminals 6. The stator winding of the alternator 2 is inductively coupled to a rotatable field winding (not shown) to which a field current is applied via input terminals 7.

The field current applied to the field winding of the alternator 2 is provided by the regulator 3 which is also of conventional form and consists of two emitter coupled transistors $T_1$ and $T_2$ which operate as a switch to energize or deenergize the field winding of the alternator which is connected in the collector circuit of transistor $T_2$. The collector of transistor $T_1$ is connected to the base of transistor $T_2$ so that when transistor $T_1$ is 'ON' transistor $T_2$ will be 'OFF,' and vice versa and in order to increase the speed in which the transistor from one state to the other takes place, the circuit is provided with an AC feedback path including resistor $R_1$ and capacitor $C_1$ connected between the collector of transistor $T_2$ and the base of transistor $T_1$. Transistor $T_1$ is also provided with a 'Miller' capacitor $C_2$ which effectively provides smoothing on the base of transistor $T_1$. The power supply for the regulator 3 is derived from the AC signals appearing at terminals 5 of the alternator 2, the AC signals being rectified by means of diodes $D_1$ to $D_3$ and fed to the regulator via a normally closed relay switch $S_1$ which forms part of the temperature compensation and protection circuit 4. A fraction of the DC supply applied to regulator 3 via terminals 8 and 9 respectively, is selected by means of a potential divider formed by resistor $R_2$, variable resistor $VR_1$ and resistor $R_3$ connected between the terminals 8 and 9, and this fraction, which exists at the wiper of the variable resistor $VR_1$ is, compared with a reference voltage $V_{REF}$ determined by a reference zener diode $ZD_1$, the base-emitter potential of transistor $T_1$ and the potential drop across emitter resistor $R_4$. Since resistor $R_4$ would normally be of very low value, the potential drop across it will be small and may be ignored. The operation of the regulator is as follows:

Consider initially that transistor $T_2$ is 'ON' and transistor $T_1$ is 'OFF' so that field current is being supplied to the field winding of the alternator 2 via terminals 7, with the result that the power supply applied to the terminals 8 and 9 of the regulator 3 is increasing. When the potential at the wiper of variable resistor $VR_1$ exceeds the reference potential $V_{REF}$, transistor $T_1$ will be turned 'ON' and transistor $T_2$ will be turned 'OFF' so disconnecting the supply to the field winding of the alternator. The charge induced in the field winding due to its inductance will discharge slowly through diode $D_4$ connected in parallel with it and the regulator supply will therefore fall. When the regulator supply falls to such a level that the potential existing at the wiper of variable resistor $VR_1$ falls below the reference voltage $V_{REF}$, transistor $T_1$ will be turned 'OFF' and transistor $T_2$ will be turned 'ON' so that field current is again applied to the field winding of alternator 2. The regulator supply will therefore increase again and the procedure will be repeated. The regulator 3 thus causes the alternator 2 to provide an output voltage containing a small amount of ripple voltage, the output voltage being dependent upon the setting of the variable resistor $VR_1$.

Now it is required that the alternator 2 be used to charge the battery 1. When a battery is charged, the heat is inevitably generated within the battery and it is this heat which limits the rate at which the battery may be charged. If the ambient battery temperature is low then the battery may be charged at a high rate, but if the ambient battery temperature is high then the battery must be charged at a lower rate or else the battery will become overheated and electrolyte may be caused to be emitted. It is thus required that a temperature compensation circuit be provided which limits the rate of charge dependent upon the battery temperature.

This is achieved in the arrangement shown by means of temperature compensation and protection circuit 4 in conjunction with a temperature sensitive device built into the battery casing, or inserted in the battery so as to sense the electrolyte temperature. Temperature sensing of the electrolyte is accomplished in the arrangement shown by means of a negative temperature coefficient device typically a thermistor T moulded into the battery 1, and the thermistor T is used to control a circuit which effectively shunts the resistor $R_2$ and the top part of the variable resistor $VR_1$ in the regulator 3 to reduce the voltage setting or effectively shunts the resistor $R_3$ and the lower part of variable resistor $VR_1$ to increase the voltage setting. Shunting of the resistors is carried out in the circuit 4 by means of complementary transistors $T_3$ and $T_4$, the bases of which are so biased that only one of the transistors conducts at any time.

The emitters of transistors $T_3$ and $T_4$ are joined and connected via resistor $R_5$ to the wiper of variable resistor $VR_1$. The shunt path for transistor $T_4$ is via resistor $R_6$ to the common negative supply rail of the system connected to terminal 8 and the shunt path for transistor $T_3$ is via resistor $R_7$ and via the rectifiers contained within the alternator 2, the stator windings of the alternator 2, the diodes $D_1$ to $D_3$ through the normally closed relay switch $S_1$ to the positive supply rail connected to terminal 9 of the regulator 3. When the regulator is operating the path from resistor $R_7$ to the positive supply rail 9 of the regulator will be low impedance. The transistors $T_3$ and $T_4$ are biased by means of a potential divider formed from resistors $R_8$ to $R_{12}$ connected in series across the battery voltage and the thermistor T is connected via a normally forward conducting divider $D_5$ across part of the potential divider formed by resistors $R_8$ to $R_{10}$. The circuit thus far described operates as follows:

As the battery temperature increases the resistance of the thermistor T will decrease and since this shunts resistors $R_8$ to $R_{10}$, the potential on the base of transistor $T_3$ will rise. Transistor $T_3$ will therefore be turned 'ON' at some predetermined voltage and will shunt resistor $R_2$ and the top part of variable resistor $VR_1$ which has the effect reducing the regulator voltage and therefore the charging current to the battery. When the battery temperature decreases, the resistance of the thermistor T will increase so that the voltages at the base of transistor $T_3$ and the base of transistor $T_4$ will decrease with the result that transistor $T_3$ will be turned 'OFF' and transistor $T_4$ will be turned 'ON' thus shunting resistor $R_3$ and the lower part of the variable resistor $VR_1$ having the effect of increasing the regulator voltage and hence the charge to the battery 1.

When the battery temperature reaches a high value above which material damage or thermal runaway may result it is arranged that the regulator becomes disabled so that the supply to the field winding of the alternator 2 is stopped, thereby preventing any further charging of the battery. This is achieved by means of transistor $T_5$ the base and emitter of which are connected across resistors $R_8$ and $R_9$ and which is normally arranged to be 'ON'. As the battery temperature increases the resistance of the thermistor T decreases so that the potential across the resistors $R_8$ and $R_9$ decreases until at a predetermined voltage, which corresponds to the maximum allowable battery temperature, is reached at which time transistor $T_5$ is turned 'OFF' which open-circuits the base of transistor $T_7$ (via normally 'ON' transistor $T_6$) so that a relay 10 connected in the collector of transistor $T_7$ becomes de-energized thereby causing the relay switch $S_1$ to be open circuited which disconnects the DC supply to the regulator 3. A diode $D_6$ is connected in parallel with the winding of the relay 10 to limit any voltage surges in the winding.

Since the thermistor T used to sense the battery temperature has a negative temperature, if it happened to become open-circuited, the regulator would assume the battery was cold (corresponding to the thermistor T having a high resistance) and consequently the charging voltage applied to the battery would be a maximum and there would be no means of limiting this charge. In order to overcome this, transistor $T_6$ is incorporated and is placed in series with the base of transistor $T_7$ and is normally held 'ON' by means of diode $D_5$ which if the thermistor T is not open-circuited is forward biased. Should the thermistor T become open-circuited, the diode $D_5$ becomes reverse biased and transistor $T_6$ is turned 'OFF' thereby turning 'OFF' transistor $T_7$ which causes the DC supply to the regulator 3 to be broken.

By positioning the relay switch $S_1$ in series with the DC supply of the regulator 3 a warning lamp 11 connected between the battery positive terminal and the regulator positive terminal may be used for the dual purpose of indicating that the alternator output voltage is low i.e. the normal function of a warning lamp in existing battery charging systems, and for indicating when the protection circuitry has operated either due to overheating or due to the thermistor T being open circuited. Alternatively the relay switch $S_1$ may be inserted in the charging circuit of the battery in which case two warning lamps may be provided, one for indicating when the alternate voltage is low and one for indicating when the protection circuitry is operative. In this latter case instead of completely open-circuiting the charge circuit, a bleed resistor may be connected across the switch so that the battery is charged at a very slow rate i.e. is trickle charged even when the protection circuitry is operative.

The system described above has the following advantages— the battery temperature is sensed directly; the regulator voltage setting is compensated to suit the battery temperature; the system incorporates fail-safe circuitry to protect the complete charging system and it uses the existing charge warning lamp to indicate circuit failure with the overall result that the battery can be fully charged at low battery temperatures without the risk of overheating at high battery temperatures and in the event of regulator failure causing battery overheating, the charge current is automatically interrupted.

The temperature compensation and protection circuit 4 has the advantage that it can be used with other known forms of regulator design than that shown, providing an appropriate zener diode is incorporated, and no regulator circuit changes or adjustment is required. This feature is important where regulators are not provided with means for voltage adjustment such as for instance when the regulator is constructed using integrated circuit techniques.

Although in the system described the thermistor T is incorporated in the battery 1, the compensation and protection circuit 4 may be used in other arrangements where the temperature sensitive device is positioned away from the battery e.g. in the regulator as in known arrangements. This latter arrangement has the disadvantage that the protection circuitry is not then operative directly on battery temperature but it would give some measure of protection against overheating.

We claim:

1. Battery charging apparatus comprising:

a generator for generating charging current for a battery, a voltage regulator having input terminals connected to a DC output from the generator, a potential divider connected across said input terminals, and means responsive to the voltage at a point on the potential divider arranged to control the operation of the generator in dependence on said voltage, a temperature compensation circuit comprising a temperature sensitive resistor arranged to sense the temperature of the battery, and shunt circuits for shunting parts of the said potential divider in dependence on the resistance of said temperature sensitive resistor, and a protection circuit comprising a first switch device operable at an upper resistance limit of said temperature sensitive resistor, a second switch device operable at a lower resistance limit of the said temperature sensitive resistor, and a third switch device arranged in an output circuit of the generator and arranged to open when the first or second switch devices is operated by the resistance of the temperature sensitive resistor reaching the said upper or lower limit.

2. Battery charging apparatus as claimed in claim 1 in which the first and second switch devices comprise first and second transistors respectively.

3. Battery charging apparatus as claimed in claim 2 in which the emitter collector circuits of the first and second transistors are connected in series and the bases of the two transistors are connected to a second potential divider, part of which is shunted by the said temperature sensitive resistor in series with a diode.

4. Battery charging apparatus as claimed in claim 2 in which the said third switch device comprises a relay, the coil of which is connected in series with a third transistor controlled by said first and second transistors.

5. Battery charging apparatus as claimed in claim 2 in which said third switch device is connected between said input terminals of the regulator and the generator.

6. Battery charging apparatus as claimed in claim 1 in which the temperature sensitive resistor comprises a thermistor located within the battery.

7. Battery charging apparatus as claimed in claim 3 in which the shunt circuits of the temperature compensating circuit comprise two shunt transistors respectively connected across opposite ends of the potential divider of the voltage regulator and arranged so that only one may conduct at a time.

8. Battery charging apparatus as claimed in claim 7 in which the bases of the two shunt transistors are connected to said second potential divider.

9. Battery charging apparatus as claimed in claim 1 in which the generator comprises an alternator having a field winding connected to an output of the said regulator, and the regulator includes a Zener diode connected to said point on the potential divider and transistor switch means coupled to the Zener diode and arranged to control the regulator output.